United States Patent
Lee et al.

(10) Patent No.: US 7,286,281 B2
(45) Date of Patent: Oct. 23, 2007

(54) ELECTROPHORETIC DISPLAY AND METHOD OF MANUFACTURING THEREOF

(75) Inventors: Yong-Uk Lee, Gwangju-si (KR); Joon-Hak Oh, Suwon-si (KR); Jong-Hyun Seo, Seoul (KR); Bo-Sung Kim, Seoul (KR); Mun-Pyo Hong, Seongnam-si (KR)

(73) Assignee: Samsung Electronics, Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/152,897

(22) Filed: Jun. 14, 2005

(65) Prior Publication Data
US 2006/0139733 A1    Jun. 29, 2006

(30) Foreign Application Priority Data
Dec. 28, 2004    (KR) .................. 10-2004-0113851

(51) Int. Cl.
*G02B 26/00*    (2006.01)
*G09G 3/34*    (2006.01)
*G03G 17/04*    (2006.01)

(52) U.S. Cl. ................... 359/296; 345/107; 430/32

(58) Field of Classification Search ............... 359/296; 345/107; 430/32
See application file for complete search history.

(56) References Cited

U.S. PATENT DOCUMENTS 6,525,865 B2 *    2/2003    Katase ................... 359/296

2005/0151195 A1*    7/2005    Kawase et al. ............. 257/347

FOREIGN PATENT DOCUMENTS

| JP | 2000-322005 | 11/2000 |
|---|---|---|
| JP | 2001264823 | 9/2001 |
| JP | 2002176178 | 6/2002 |
| JP | 2003315839 | 11/2003 |
| JP | 2004020928 | 1/2004 |
| JP | 2004221562 | 8/2004 |
| KR | 100245061 | 11/1999 |
| KR | 102002077512 | 10/2002 |
| KR | 102002081421 | 10/2002 |
| KR | 102003074472 | 9/2003 |

* cited by examiner

*Primary Examiner*—Ricky Mack
*Assistant Examiner*—William C Choi
(74) *Attorney, Agent, or Firm*—F. Chau & Associates, LLC

(57) ABSTRACT

A electrophoretic display is provided, which includes: a thin film transistor array panel including a plurality of data lines having a plurality of source electrodes and a plurality of drain electrodes, a plurality of organic semiconductor islands at least covering the portion of the source and the drain electrodes and disposed between the source and the drain electrodes, a plurality of gate insulators formed on the organic semiconductor islands, a plurality of gate lines including a plurality of gate electrodes disposed on the gate insulators, and a plurality of pixel electrodes connected to the drain electrodes; a common electrode panel facing the thin film transistor array panel and having a common electrode; and a plurality of micro-capsules containing a plurality of negative and positive pigment particles and interposed between the thin film transistor array panel and the common electrode panel.

10 Claims, 14 Drawing Sheets

ELECTROPHORETIC DISPLAY AND METHOD OF MANUFACTURING THEREOF

BACKGROUND OF THE INVENTION (a) Field of the Invention

The present invention relates to an electrophoretic display and a method of manufacturing thereof.

(b) Description of the Related Art

An electrophoretic display (EPD) is one type of flat panel display devices that are used for electronic books. The EPD includes two panels including field-generating electrodes and a plurality of micro-capsules interposed between the panels. Each micro-capsule includes electric ink containing a plurality of white and black pigment particles that are negatively and positively charged. Upon application of an electric field in the micro-capsules, the white and black particles move in opposite directions to display images.

The EPD has high reflectance and high contrast without dependency on viewing directions and thus it is comfortable for a viewer to see a screen of the EPD as if he sees a paper. Since the micro-capsule has bistability of black and white states, it maintains its color without maintaining the voltage across the micro-capsule, once set for black or white. Accordingly, the EPD exhibits small power consumption. In addition, the EPD does not require polarizers, alignment layers, liquid crystal, etc., that are expensive requisites for a liquid crystal display, and thus is the EPD can be manufactured at low cost.

However, the EPD has not a light blocking member to prevent the light incident from the external because the EPD is reflective type and does not include a light source. Accordingly, it is preferable that the leakage current due to external light is minimized to enhance the characteristics of the EPD.

SUMMARY OF THE INVENTION

A electrophoretic display is provided, which includes: a thin film transistor array panel including a plurality of data lines having a plurality of source electrodes and a plurality of drain electrodes, a plurality of organic semiconductor islands at least covering the portion of the source and the drain electrodes and disposed between the source and the drain electrodes, a plurality of gate insulators formed on the organic semiconductor islands, a plurality of gate lines including a plurality of gate electrodes disposed on the gate insulators, and a plurality of pixel electrodes connected to the drain electrodes; a common electrode panel facing the thin film transistor array panel and having a common electrode; and a plurality of micro-capsules containing a plurality of negative and positive pigment particles and interposed between the thin film transistor array panel and the common electrode panel.

The electrophoretic display may further include a partition having a plurality of openings disposed on the data lines and the drain electrodes and defining the organic semiconductor islands.

The gate insulators may be disposed in the plurality of openings.

The electrophoretic display may further include a passivation layer covering the gate line, and the pixel electrodes may be disposed on the passivation layer.

The pixel electrodes may include opaque conductive material.

The gate electrode may be closer than the organic semiconductor islands to the common electrode panel.

The thin film array panel and the common electrode panel may be combined to each other by an adhesive.

The gate insulating layer may include at least a material selected from the group consisting of silicon dioxide, silicon nitride, maleimide-styrene, polyvinylphenol (PVP), and modified cyanoethylpullulan (m-CEP).

The organic semiconductor may include at least a material selected from the group consisting of: tetracene, pentacene, and derivatives thereof with substituent; oligothiophene including four to eight thiophenes connected at the positions 2, 5 of thiophene rings; perylenetetracarboxylic dianhydride (PTCDA), naphthalenetetracarboxylic dianhydride (NTCDA), and imide derivatives thereof; metallized phthalocyanine and halogenated derivatives thereof; co-oligomer and co-polymer of thienylene and vinylene; regioregular polythiophene; perylene, coroene, and derivatives thereof with substituent; and aromatic and heteroaromatic ring of the above-described materials with at least one hydrocarbon chain having one to thirty carbon atoms.

A method of manufacturing a electrophoretic display is provided, the method includes forming a plurality of data lines including a plurality of source electrode, and a plurality of drain electrodes on a substrate; forming a plurality of organic semiconductor islands covering the portions of the source and the drain electrodes; forming a plurality of gate insulators covering the organic semiconductor islands; forming a plurality of gate lines including a plurality of gate electrodes on the gate insulators; forming a passivation layer having a plurality of contact holes exposing the drain electrode and covering the gate lines; and forming a plurality of pixel electrodes on the passivation layer.

The method of the electrophoretic display may further include forming a partition having a plurality of openings exposing the portions of the drain electrode and the source electrode before forming the organic semiconductor islands.

The organic semiconductor islands may be formed by ink jet printing, and the gate insulator may be formed by ink jet printing.

The method of the electrophoretic display may further include combining a common electrode panel having a plurality of micro-capsules, a common electrode and an adhesive on the pixel electrodes after forming the pixel electrodes.

The common electrode panel may be laminated on the substrate.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
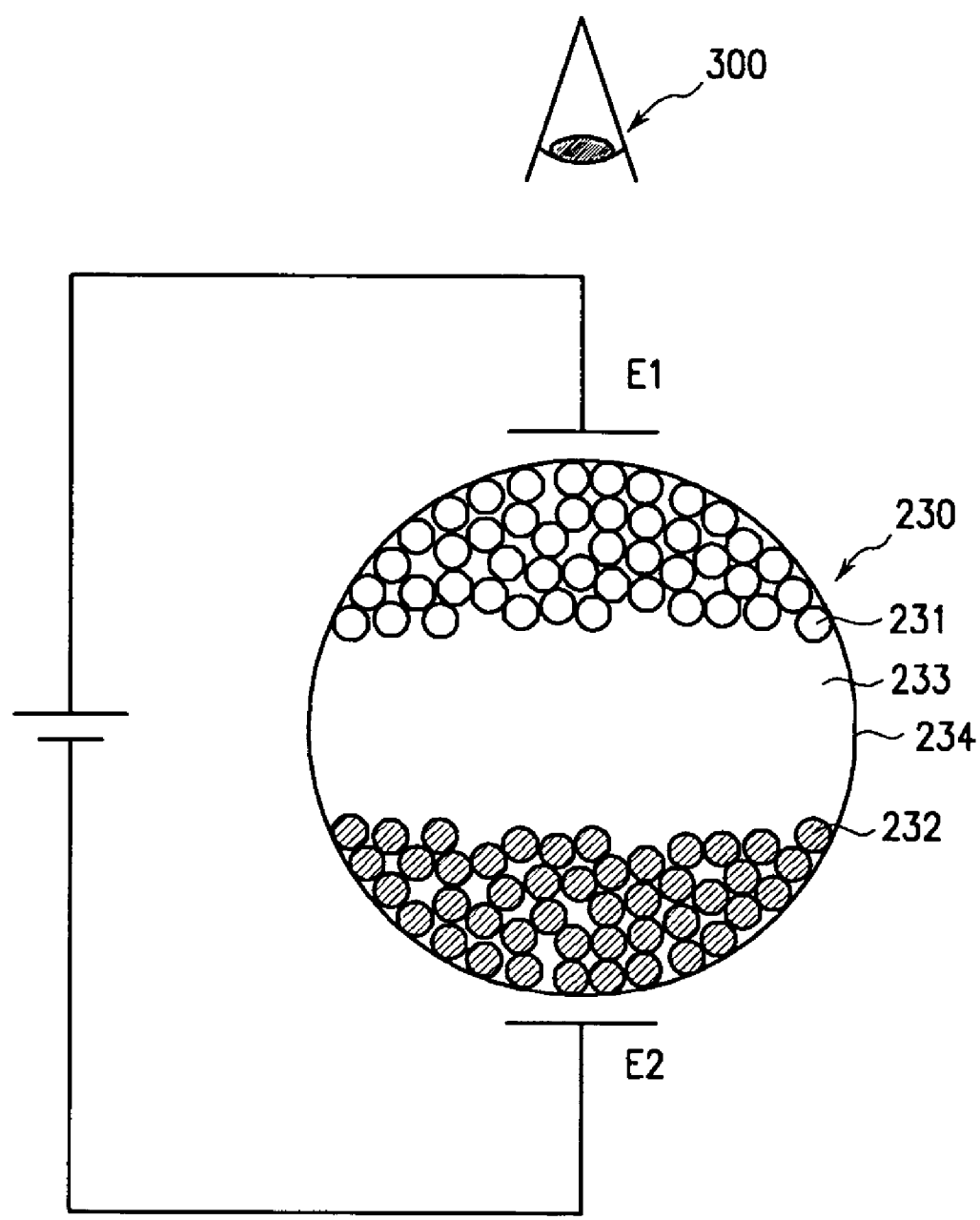
FIG. 1 is a schematic diagram illustrating a driving principle of an EPD according to an embodiment of the present invention.

The present invention will now be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Then, an EPD and manufacturing methods thereof according to embodiments of the present invention will be described with reference to the accompanying drawings.

A driving principle and a structure of the EPD according to an embodiment of the present invention will be described with reference to FIGS. 1 to 3.

Figure 2:
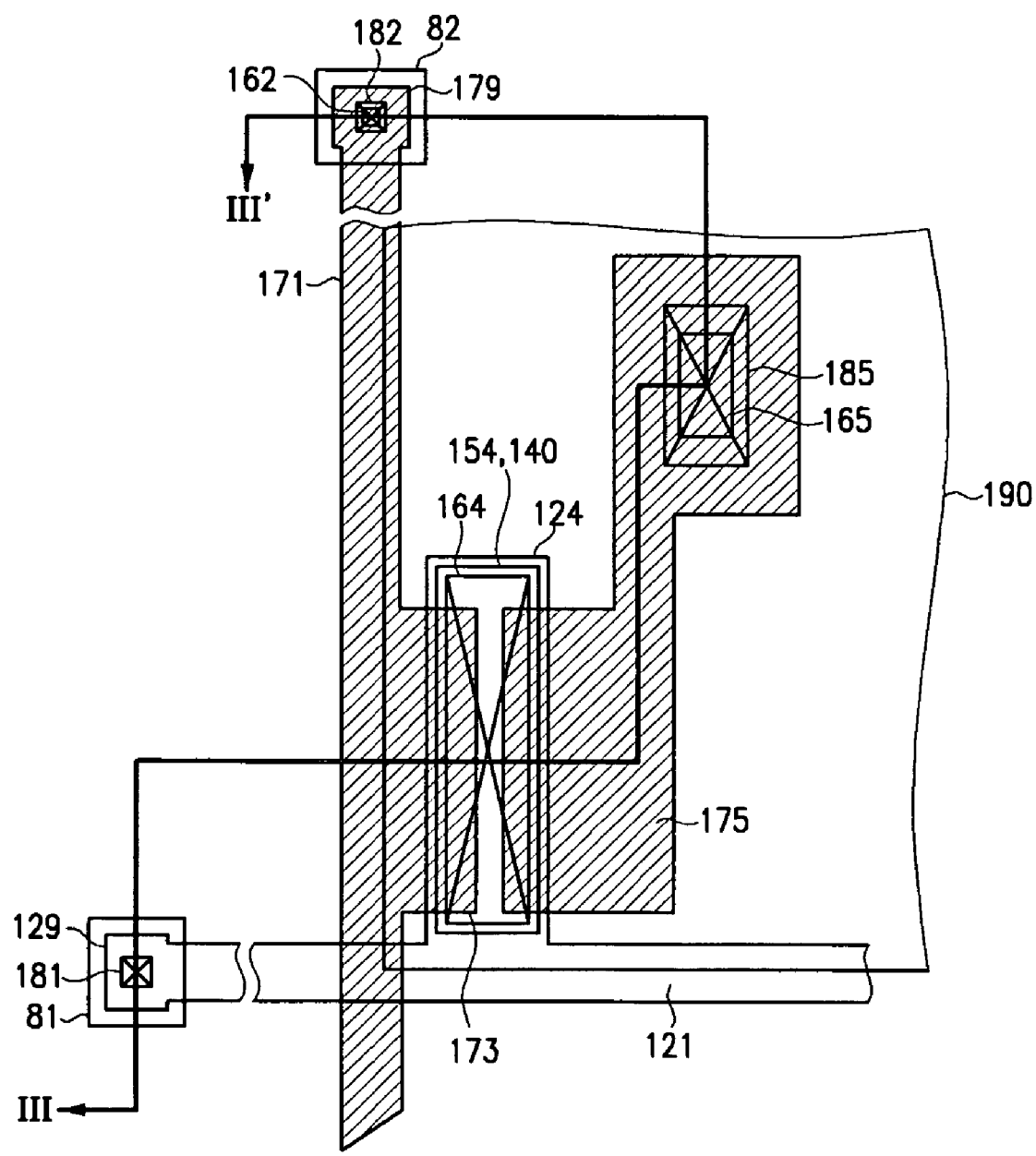
FIG. 2 is a layout view of an EPD according to an embodiment of the present invention.
Figure 3:
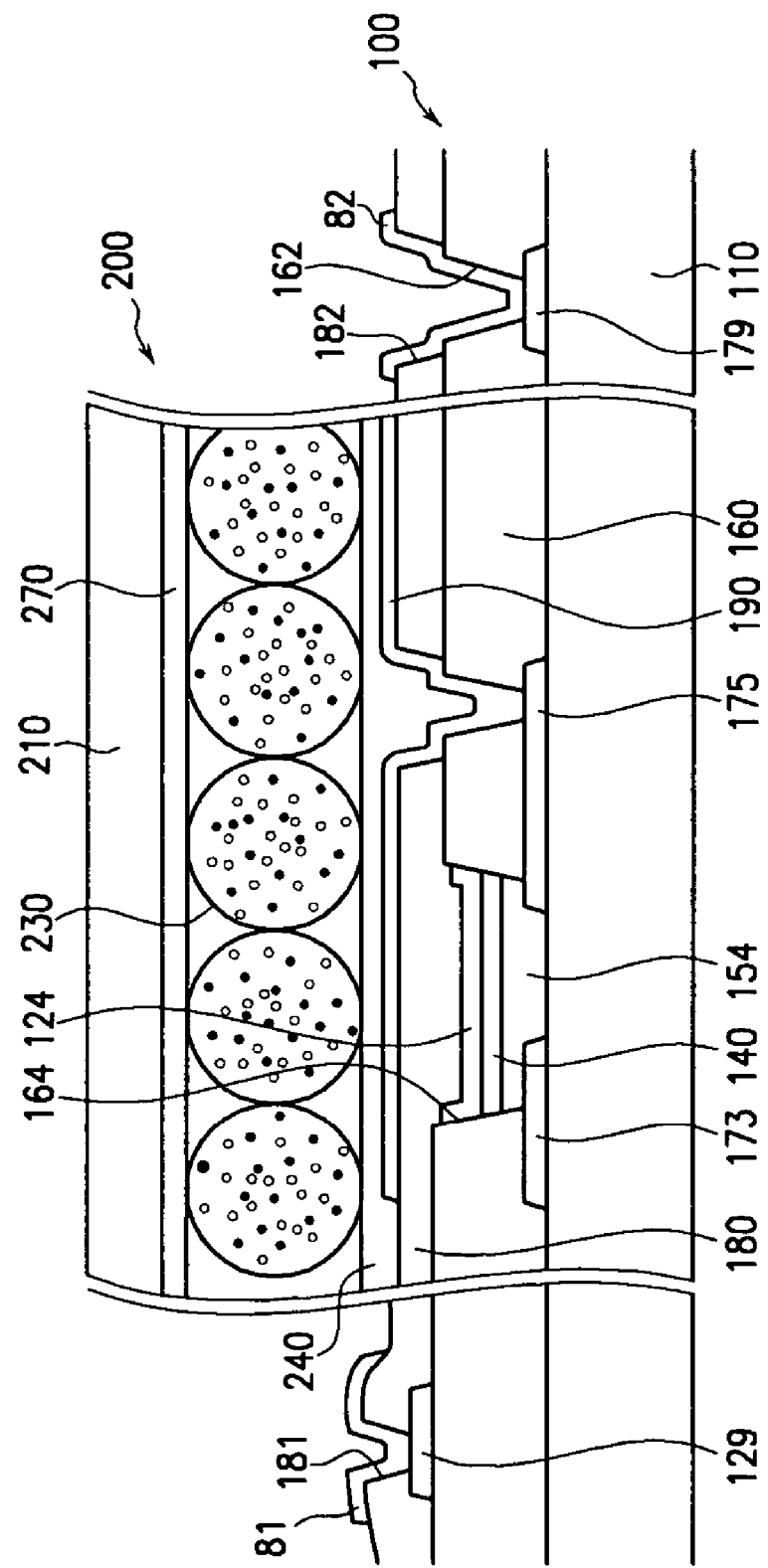
FIG. 3 is a sectional view of the EPD shown in FIG. 2 taken along the line III-III'.

FIG. 1 is a schematic diagram illustrating a driving principle of an EPD according to an embodiment of the present invention, FIG. 2 is a layout view of an EPD according to an embodiment of the present invention, and FIG. 3 is a sectional view of the EPD shown in FIG. 2 taken along the line III-III'.

Referring to FIGS. 1 and 2, an EPD according to this embodiment includes a pair of field-generating electrodes 190 (referring to FIG. 3) and 270 (referring to FIG. 3) and a plurality of micro-capsules 230 interposed between the electrodes E1 and E2.

Each micro-capsule 230 includes electric ink containing a plurality of white and black pigment particles 231 and 232 that are negatively and positively charged and a spherical capsule wall 234.

Upon application of voltages to the electrodes 190 and 270, the white and black particles 231 and 232 move in opposite directions to color the surface of the micro-capsule and an observer 300 can see a black and white colored image. The pigment particles 231 and 232 may represent one of the primary colors such as red, green and blue colors.

Referring to FIGS. 2 and 3, an array of pixel electrodes (190) as a kind of field-generating electrodes are formed on a panel 100 called a thin film transistor (TFT) array panel including a plurality of TFTs (not shown) connected to the pixel electrodes 190 and a plurality of signal lines (121, 171) connected to the TFTs. On the other hand, a common electrode (270) as the other field-generating electrode is formed on another panel 200 called a common electrode panel including a flexible plastic film 210. A plurality of micro-capsules 230 is interposed between the two field-generating electrodes 190, 270.

First, a TFT array panel for an EPD according to an embodiment of the present invention will be described in detail with reference to FIGS. 2 and 3.

A plurality of data lines 171 and a plurality of drain electrodes 175 are formed on an insulating substrate 110 such as transparent glass.

The data lines 171 extend substantially in the longitudinal direction to transmit data voltages and intersect the gate lines 121. Each data line 171 includes an end portion 179 having a large area for contact with another layer or an external device and a plurality of source electrodes 173 projecting toward a gate electrode 124. Each pair of the source electrodes 173 and the drain electrodes 175 are separated from each other and disposed opposite each other with respect to the gate electrode 124.

The data lines 171 and the drain electrodes 175 include a material such as ITO (indium tin oxide), Cr, Au, Ni and Mo having good physical, chemical, and electrical contact characteristics with other materials such as organic semiconductor. In particular, the ITO has high work function as well as good contact characteristics with organic semiconductor.

The data lines 171 and the drain electrodes 175 have inclined edge profiles, and the inclination angles thereof range about 30-80 degrees.

A buffer layer (not shown) made of acrylic organic dielectric material or inorganic dielectric material such as silicone oxide or silicone nitride may be formed on the insulating substrate 110. It is preferable that the organic dielectric material is acrylic materials or Benzocyclobutene (BCB), and inorganic dielectric material such as silicone oxide or silicone nitride. They can secure the stable contact characteristic of the organic semiconductor and preferably have high light permeability.

A partition 160 is formed on the insulating substrate 110 having the data lines 171 and the drain electrodes 175 thereon. The partition 160 exposes the portions of the source and the drain electrodes 173 and 175, and the portion of the insulating substrate 110 disposed between the source electrode 173 and the drain electrode 175 to define openings 164. The partition 160 defines the position of the organic semiconductor and it is preferably made of photosensitive organic material. Also, the partition 160 has the thickness of about 2-5 microns and a plurality of contact holes 162 and 165 respectively exposing end portions 179 of the data lines 171 and the drain electrodes 175, and having inclined side wall of taper structure.

A plurality of organic semiconductor islands 154 are formed on the source electrodes 173, the drain electrodes 175 and the insulating substrate 110 and confined in the openings 164 defined by the partition 160. The organic semiconductor islands 154 simultaneously cover the portions of the source electrode 173 and the drain electrodes 175, which are exposed through the openings 164.

The organic semiconductor may include high molecular compound or low molecular compound that is soluble in aqueous solution or organic solvent. Usually, high molecular organic semiconductor is very soluble in solvent and thus suitable for printing processes such as ink-jet printing etc. Some of low molecular organic semiconductors are very soluble in organic solvent, which are suitable for forming the semiconductor islands 154. The organic semiconductor 154 may be formed by spin-coating, and may be etched using a photolithography process.

The organic semiconductor islands 154 may be made of or made from derivatives of tetracene or pentacene with substituent. Alternatively, the organic semiconductor islands 154 may be made of oligothiophene including four to eight thiophenes connected at the positions 2, 5 of thiophene rings.

The organic semiconductor islands 154 may be made of perylenetetracarboxylic dianhydride (PTCDA), naphthalenetetracarboxylic dianhydride (NTCDA), or their imide derivatives.

The organic semiconductor islands 154 may be made of metallized phthalocyanine or halogenated derivatives thereof. The metallized phthalocyanine may include Cu, Co, Zn, etc.

The organic semiconductor islands 154 may be made of co-oligomer or co-polymer of thienylene and vinylene. In addition, organic semiconductor islands 154 may be made of regioregular polythiophene.

The organic semiconductor islands 154 may be made of perylene, coroene or derivatives thereof with substituent.

The organic semiconductor islands 154 may be made of derivatives of aromatic or heteroaromatic ring of the above-described derivatives with at least one hydrocarbon chain having one to thirty carbon atoms.

A plurality of gate insulator islands 140 is formed on the organic semiconductor islands 154 in the openings 164 of the partition 160.

The gate insulator 140 may include a high molecular compound or a low molecular compound that is soluble in aqueous solution or organic solvent. Usually, a high molecular gate insulator is very soluble in solvent and thus suitable for printing processes such as ink-jet printing etc. Some of low molecular organic semiconductors are very soluble in organic solvent, which are suitable for the gate insulator islands 140. The gate insulator islands 140 may be formed by spin-coating, and may be etched using a photolithography process. During etching, the materials consisting of the gate insulators 140 have an undesired influence on the organic semiconductor islands 154. That is to say, the organic semiconductor islands 154 must not have solubility against organic solvent when forming the gate insulator islands 140, and the gate insulator islands 140 also must not have solubility against organic solvent for the organic semiconductor islands 154.

The gate insulating layer 140 is preferably made of silicon dioxide ($SiO_2$) and has a surface treated with octadecyltrichloro-silane (OTS). However, the gate insulating layer 140 is preferably made of silicon nitride (SiNx), or organic material such as maleimide-styrene, polyvinylphenol (PVP), modified cyanoethylpullulan (m-CEP) and parylene.

A plurality of gate lines 121 are formed on the partition 160 defining the organic semiconductor islands 154 and the gate insulator islands 140.

The gate lines 121 extend substantially in a transverse direction to transmit gate signals. Each gate line 121 includes a plurality of gate electrodes 124 protruding upward and an end portion 129 having a large area for contact with another layer or a driving circuit. The gate lines 121 may extend to be connected to a driving circuit (not shown) that may be integrated on the substrate 110.

The gate lines 121 are preferably made of Al containing metal such as Al and Al alloy, Ag containing metal such as Ag and Ag alloy, Cu containing metal such as Cu and Cu alloy, Au containing material such as Au and Au alloy, Mo containing metal such as Mo and Mo alloy, Cr, Ti or Ta. The gate lines 121 may have a multi-layered structure including two films having different physical characteristics. One of the two films is preferably made of low resistivity metal including Al containing metal, Ag containing metal, and Cu containing metal for reducing signal delay or voltage drop in the gate lines 121. The other film is preferably made of material such as Mo containing metal (MoW alloy), Cr, Ta or Ti, which has good physical, chemical, and electrical contact characteristics with other materials such as indium tin oxide (ITO) or indium zinc oxide (IZO). However, they may be made of various metals or conductors.

The lateral sides of the gate lines 121 are inclined relative to a surface of the substrate, and the inclination angle thereof ranges about 30-80 degrees.

A gate electrode 124, a source electrode 173, and a drain electrode 175 along with a semiconductor island 154 form a TFT having a channel formed in the semiconductor island 154 disposed between the source electrode 173 and the drain electrode 175.

A passivation layer 180 is formed on the gate lines 121, and the partition 160. The passivation layer 180 is preferably made of inorganic insulator such as silicon nitride or silicon oxide, organic insulator, or low dielectric insulating material. The low dielectric material preferably has dielectric constant lower than 4.0 and examples thereof are a-Si:C:O and a-Si:O:F formed by plasma enhanced chemical vapor deposition (PECVD).

The passivation layer 180 has a plurality of contact holes 182 and 185 respectively exposing end portions 179 of the data lines 171 and the drain electrodes 175 along with the contact holes 162 and 165 of the partition 160. The passivation layer 180 and the gate insulating layer 140 have a plurality of contact holes 181 exposing end portions 129 of the gate lines 121.

When end portions 129 and 179 of the data and the gate lines 121 and 171, and the drain electrodes 175 are exposed through the contact holes 181, 182 and 185, it is preferable that the conductive material having poor contact characteristics such as Al is not exposed through the contact holes 181, 182 and 185 to enhancing contact characteristics between a conductive layer including ITO or IZO and end portions 129 and 179 of the data and the gate lines 121 and 171, and the drain electrodes 175. Also, the edge of end portions 129 and 179 of the data and the gate lines 121 and 171, and the drain electrodes 175 may be exposed through the contact holes 181, 182 and 185.

A plurality of pixel electrodes 190 and a plurality of contact assistants 81 and 82, which are preferably made of IZO or ITO, are formed on the passivation layer 180. The pixel electrodes 190 and the contact assistants 81 and 82 are preferably made of transparent conductor such as ITO or IZO or reflective conductor such as Ag or Al.

The pixel electrodes 190 are physically and electrically connected to the drain electrodes 175 through the contact holes 185 such that the pixel electrodes 190 receive the data voltages from the drain electrodes 175.

The pixel electrodes 190 overlap the gate lines 121 and the data lines 171 to increase the aperture ratio.

The contact assistants 81 and 82 are connected to the exposed end portions 129 of the gate lines 121 and the exposed end portions 179 of the data lines 171 through the contact holes 181 and 182, respectively. The contact assistants 81 and 82 are not required but are preferred to protect the exposed portions 129 and 179 and to complement the adhesiveness of the exposed portion 129 and 179 and external devices.

Operation of the described organic TFT will now be described.

A TFT having P type semiconductor is described below.

When no voltage is applied to the gate electrode 124, the source electrode 173, or the drain electrode 175, electric charges are uniformly dispersed in the organic semiconductor island 154. When a voltage is applied between the source electrode 173 and the drain electrode 175, the current increases proportional to the voltage as long as the voltage is low.

When a positive voltage is applied to the gate electrode 124, holes are driven upward by the electric field. Accordingly, a depletion layer that has no conductive electric charge is formed near the gate insulator. At this time, if a voltage is applied between the source electrode 173 and the drain electrode 175, a small current of less than the current when no voltage is applied to the gate electrode 124 flows, since conductive electric charges are depleted. On the contrary, when a negative voltage is applied to the gate electrode 124, holes are driven downward by the electric field. Accordingly, an accumulation layer that has sufficient conductive electric charge is formed near the gate insulator 140. At this time, if a voltage is applied between the source electrode 173 and the drain electrode 175, a large current of more than the current when no voltage is applied to the gate electrode 124 flows since conductive electric charges are accumulated.

Therefore, the amount of current flowing between the source electrode 173 and the drain electrode 175 can be controlled by applying a positive or negative voltage to the gate electrode 124. The ratio of "on" current versus "off" current is called the on/off ratio. The larger the on/off ratio is, the more superior the TFT is.

The common electrode panel 200 will now be described with reference to FIG. 3.

A common electrode 270 preferably made of a transparent conductive material such as ITO and IZO and generating electric field in cooperation with the pixel electrodes 190 is formed on an insulating substrate 210.

A plurality-of micro-capsule 230 including electric ink containing a plurality of white and black pigment particles 231 and 232 that are negatively and positively charged and a spherical capsule wall 234 (referring to FIG. 1) are arranged on the common electrode 270.

An adhesive 240 on which the micro-capsules 230 are dispersed is formed on the insulating substrate 210. The adhesive 240 is used to combine the TFT array panel 100 and the common electrode panel 200 by using a laminator (not shown).

In the EPD according to the embodiment of the present invention, because the gate electrode 124 is disposed on the organic semiconductor island 154, the gate electrode 124 blocks external light incident on the organic semiconductor islands 154. Accordingly, the leakage current due to external light may be minimized, thereby enhancing the contrast ratio of the EPD.

Now, a method of manufacturing the EPD shown in FIGS. 1-3 according to an embodiment of the present invention will be described in detail with reference to FIGS. 4-14 as well as FIGS. 1-3.

Figure 4:
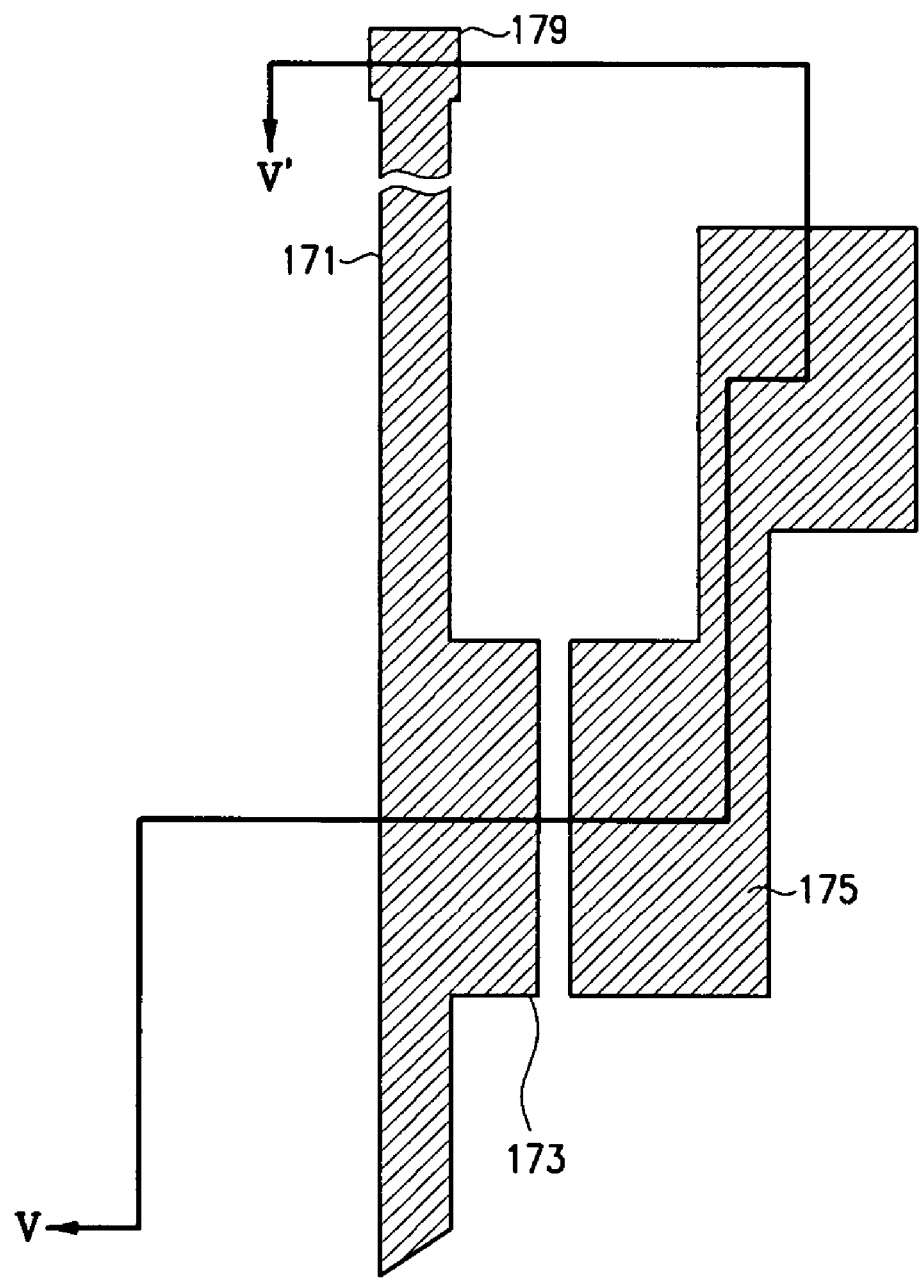
FIGS. 4, 6, 8, 10 and 12 are layout views of a TFT array panel shown in FIGS. 2 and 3 in intermediate steps of a manufacturing method thereof according to an embodiment of the present invention.
Figure 5:
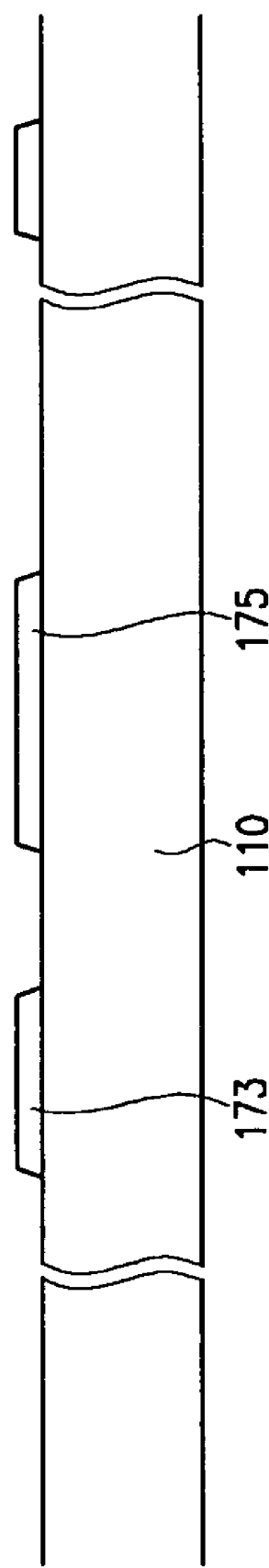
FIG. 5 is a sectional view of the TFT array panel shown in FIG. 4 taken along the line V-V'.
Figure 6:
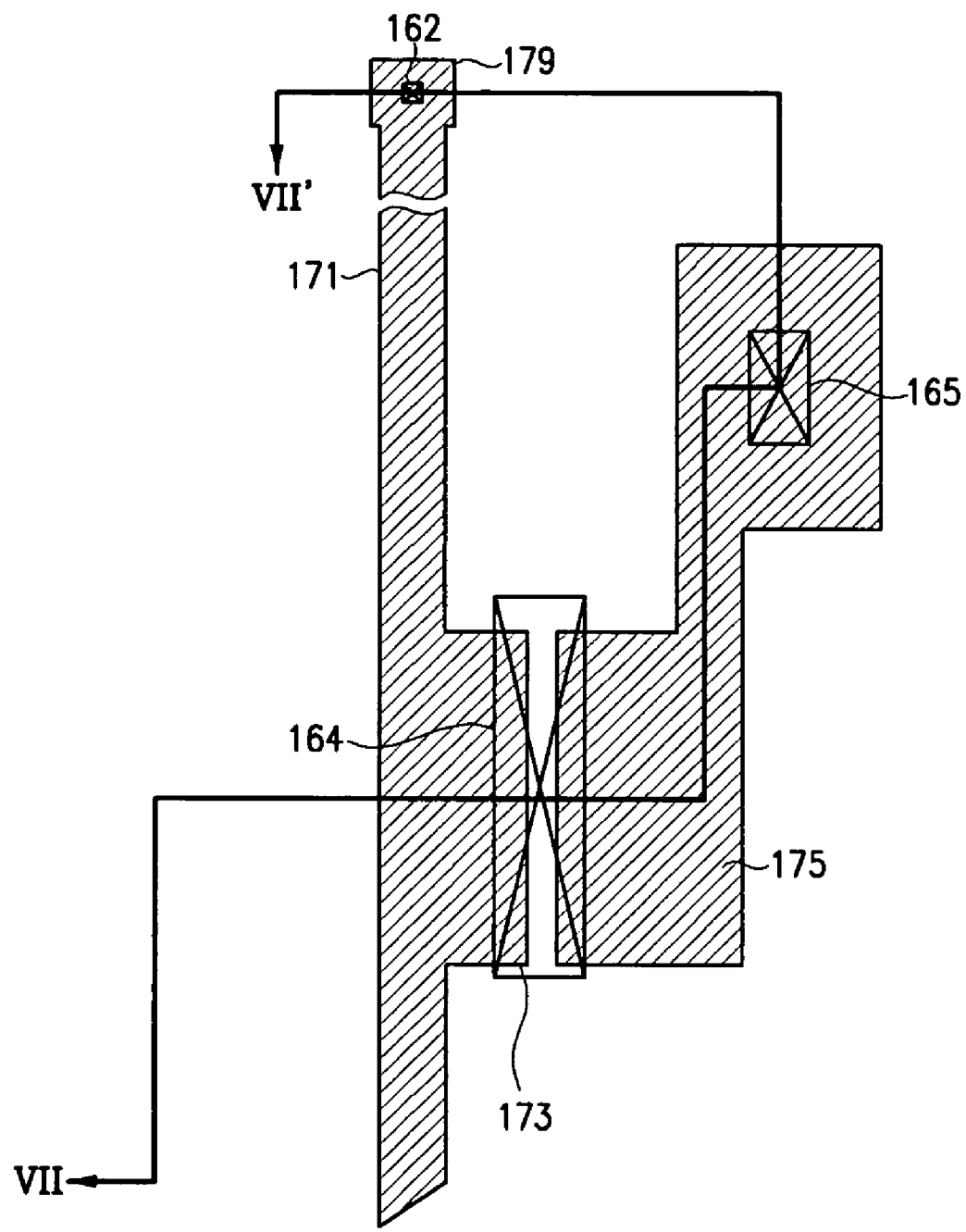
Figure 7:
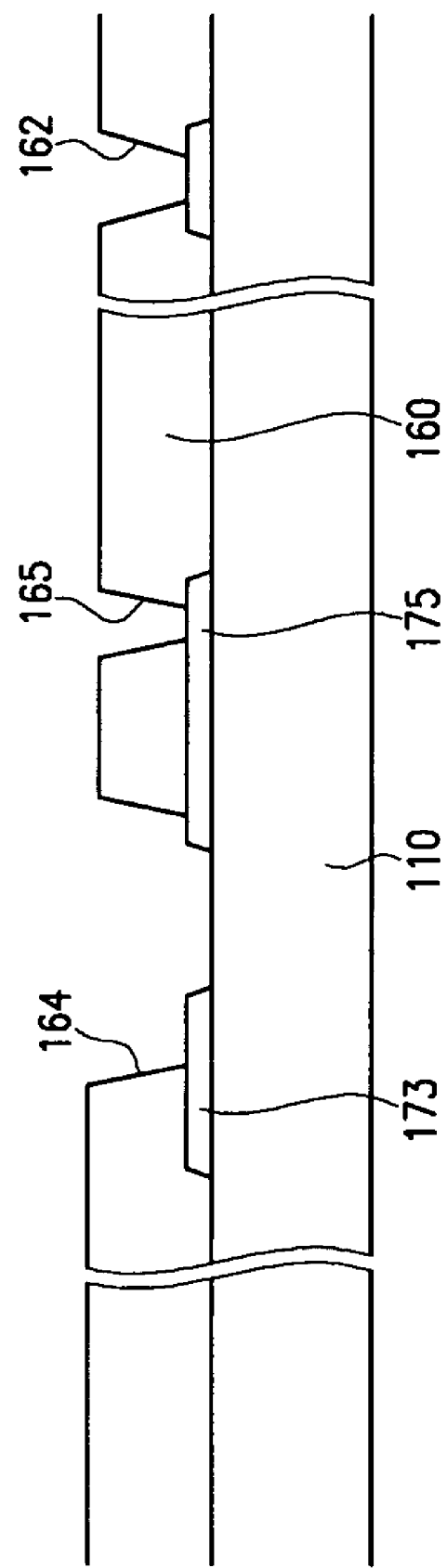
FIG. 7 is a sectional view of the TFT array panel shown in FIG. 6 taken along the line VII-VII'.
Figure 8:
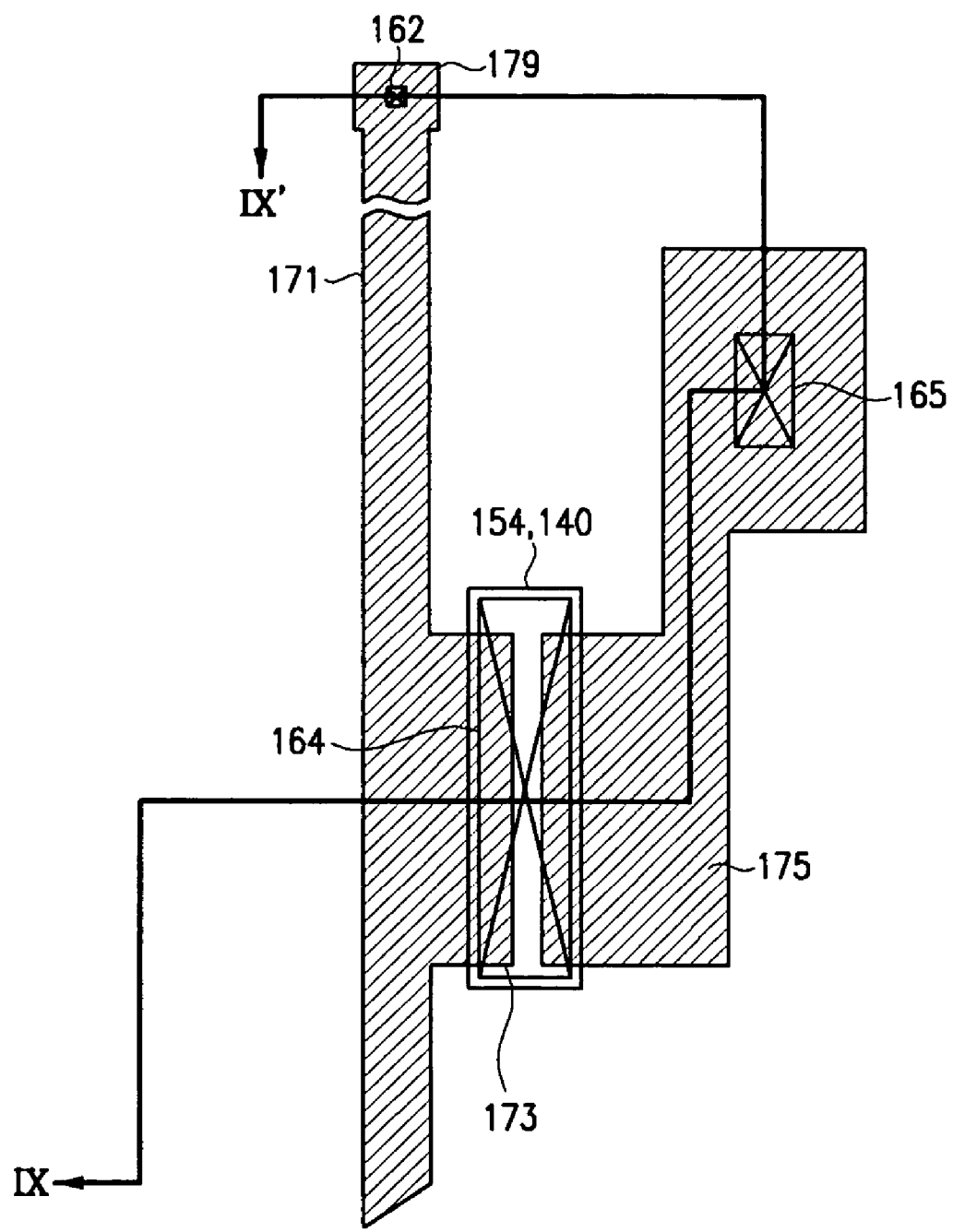
Figure 9:
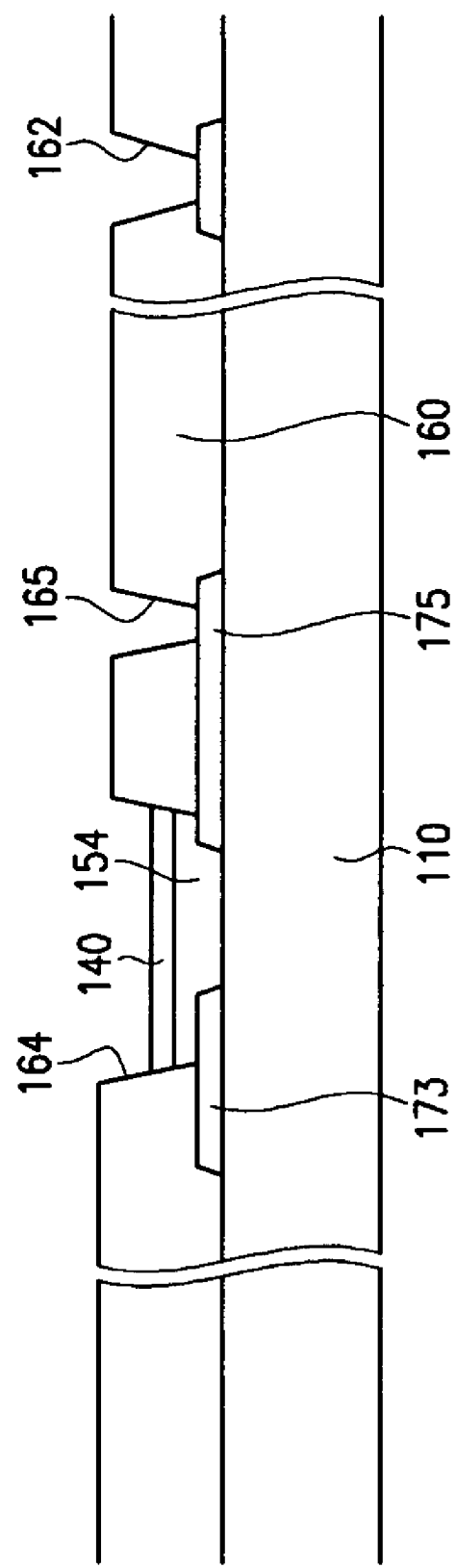
FIG. 9 is a sectional view of the TFT array panel shown in FIG. 8 taken along the line IX-IX'.
Figure 10:
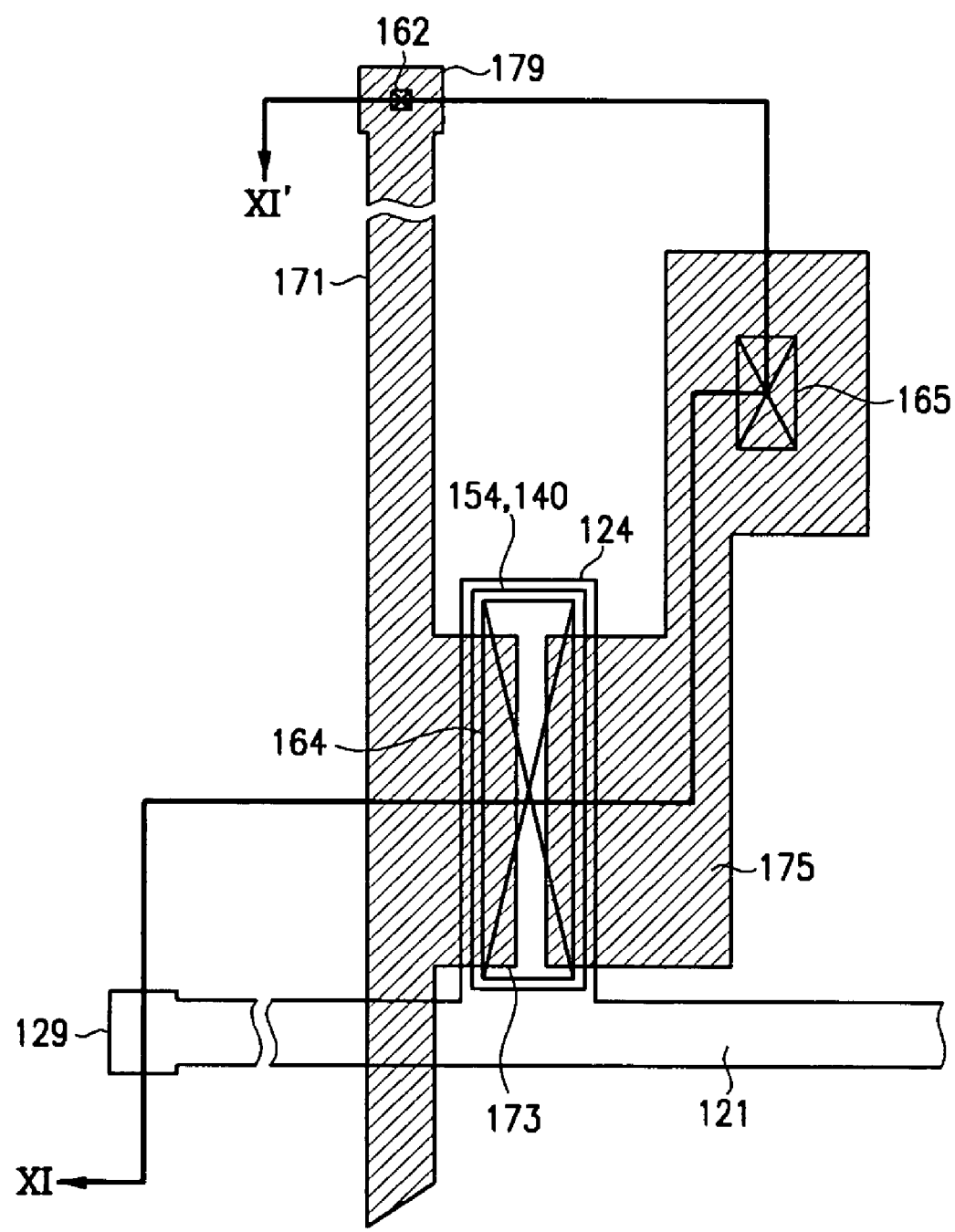
Figure 11:
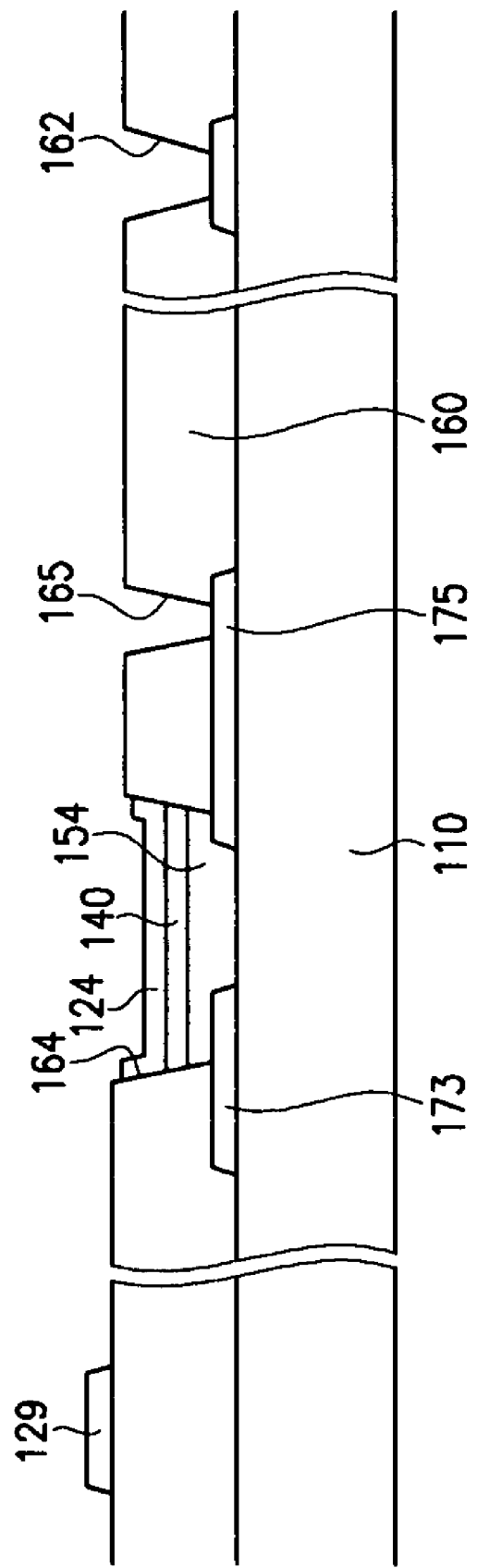
FIG. 11 is a sectional view of the TFT array panel shown in FIG. 10 taken along the line XI-XI'.
Figure 12:
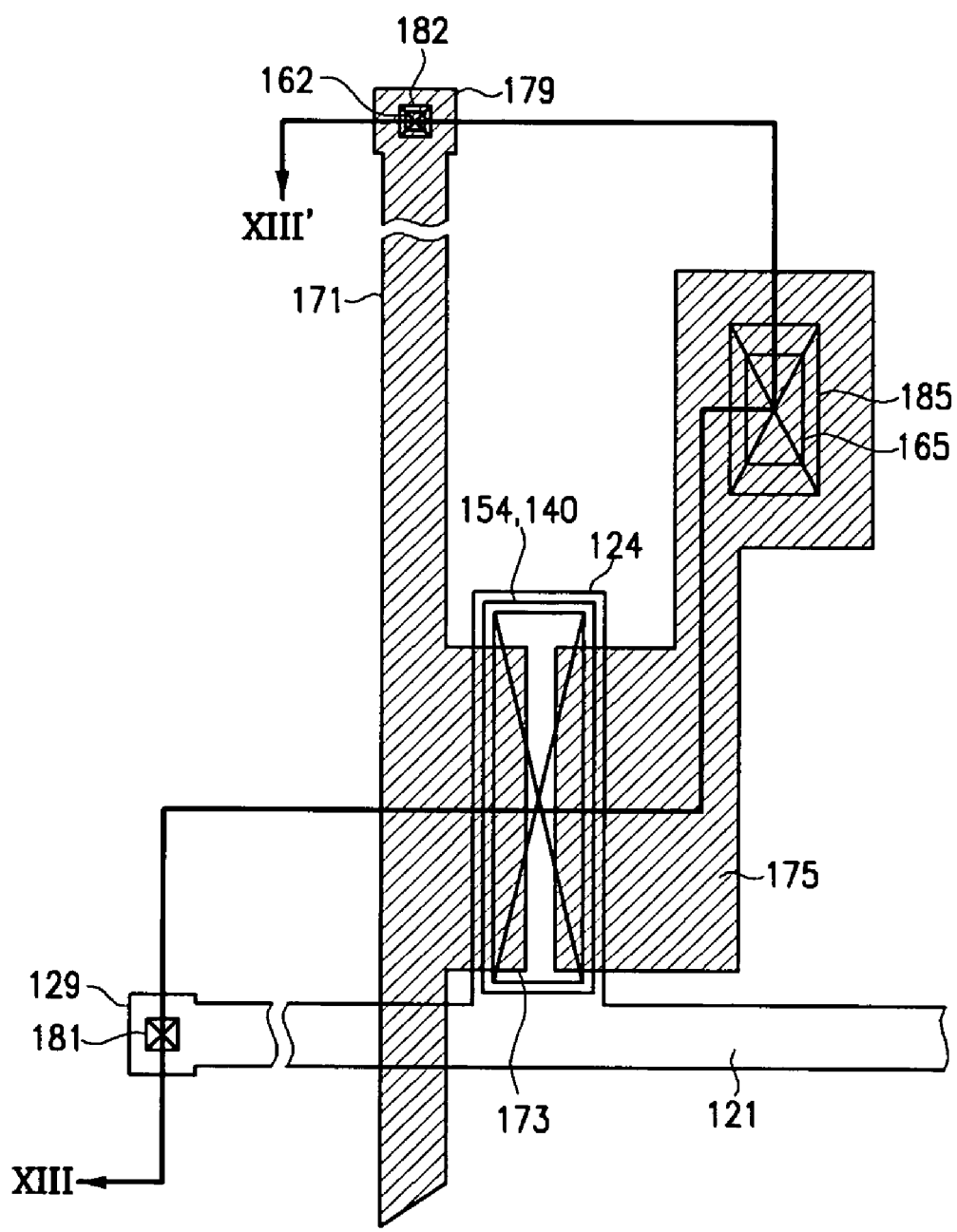
Figure 13:
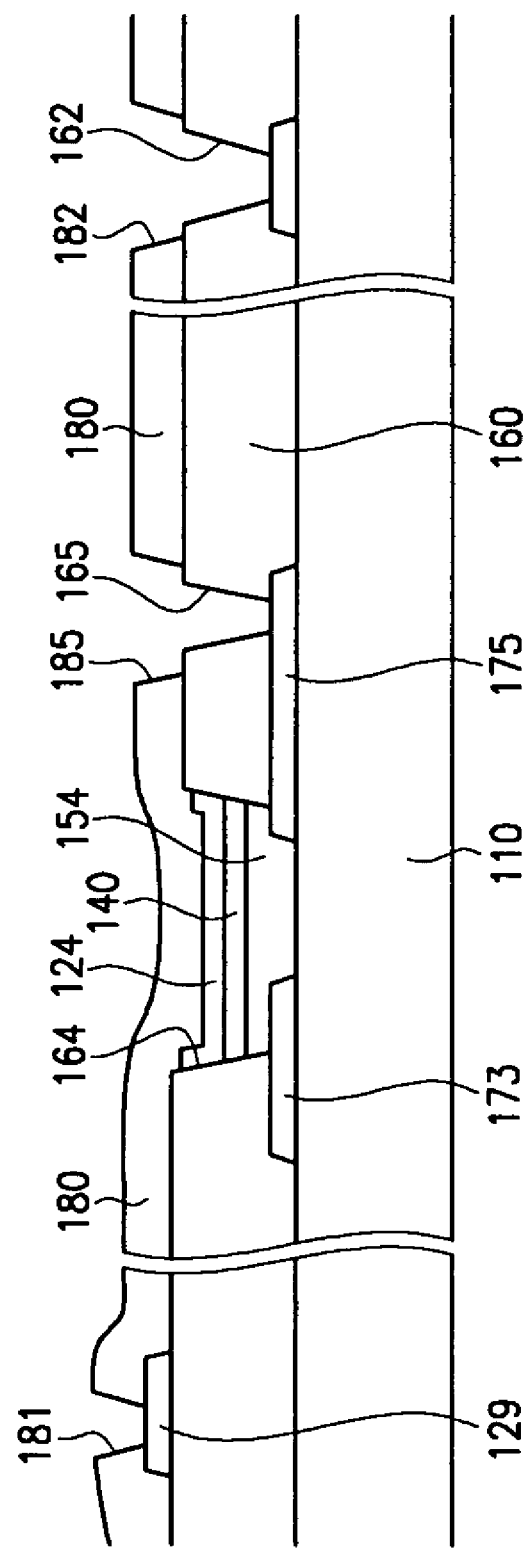
FIG. 13 is a sectional view of the TFT array panel shown in FIG. 12 taken along the line XIII-XIII'.
Figure 14:
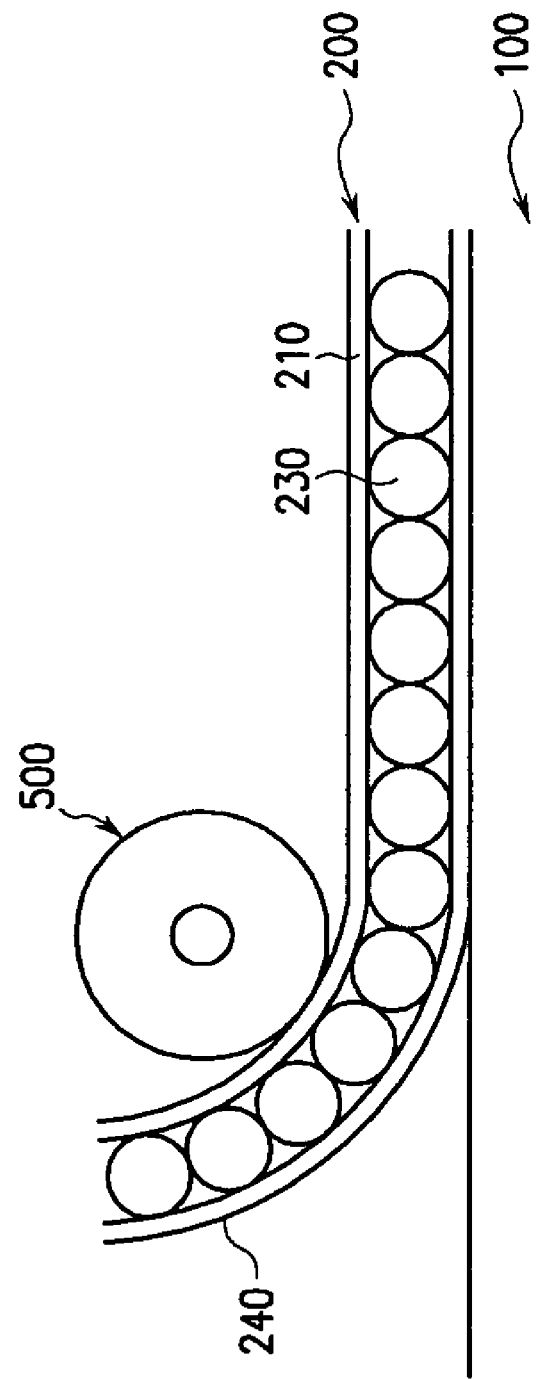
FIG. 14 illustrates a process for attaching a common electrode panel in a manufacturing method of the EPD according to an embodiment of the present invention.

FIGS. 4, 6, 8, 10 and 12 are layout views of a TFT array panel shown in FIGS. 2 and 3 in intermediate steps of a manufacturing method thereof according to an embodiment of the present invention, FIG. 5 is a sectional view of the TFT array panel shown in FIG. 4 taken along the line V-V', FIG. 7 is a sectional view of the TFT array panel shown in FIG. 6 taken along the line VII-VII', FIG. 9 is a sectional view of the TFT array panel shown in FIG. 8 taken along the line IX-IX', FIG. 11 is a sectional view of the TFT array panel shown in FIG. 10 taken along the line XI-XI', FIG. 13 is a sectional view of the TFT array panel shown in FIG. 12 taken along the line XIII-XIII'; and FIG. 14 illustrates a process for attaching a common electrode panel in a manufacturing method of the EPD according to an embodiment of the present invention.

Referring to FIGS. 4 and 5, a conductive layer preferably made of low resistivity metal and having good contact characteristics with organic semiconductor is deposited by vacuum heat deposition, etc., and the conductive layer is patterned by lithography and etching to form a plurality of data lines 171 including source electrodes 173 and end portion 179 and a plurality of drain electrodes 175.

Referring to FIGS. 6 and 7, an insulating layer made of photosensitive organic material is coated by spin coating, etc., on the insulating substrate 110. Then, the insulating layer is patterned by lithography and etching to form a partition 160 having a plurality of openings 164 defining the position of the organic semiconductor, and a plurality of contact holes 162 and 165 respectively exposing end portions 179 of the data lines 171 and the drain electrodes 175.

Referring to FIGS. 8 and 9, an organic semiconductor material is formed by ink-jet printing in the openings 164 of the partition 160 to form a plurality of organic semiconductor islands 154. In a manufacturing method according to other embodiment, when an organic semiconductor layer is coated by spin coating on the insulating substrate 110, the organic semiconductor layer is patterned by photolithography to form the organic semiconductor islands 154.

Next, a liquefied layer made of organic insulating material is dropped by ink-jet printing on the organic semiconductor islands 154 in the openings 164 of the partition 160 to form a plurality of gate insulator islands 140. In a manufacturing method according to other embodiment, when an organic insulating layer is coated by spin coating on the insulating substrate 110, the insulating layer is patterned by photolithography to form the gate insulator islands 140. The insulating layer made of silicon nitride or silicon oxide is patterned by photolithography using photoresist as an etch mask.

Referring to FIGS. 10 and 11, a conductive layer having low resistivity is sputtered and patterned by photo-etching with a photoresist to form a plurality of gate lines 121 including a plurality of gate electrodes 124 with tapered structure.

Referring to FIGS. 12 and 13, a passivation layer 180 is deposited and patterned to form a plurality of contact holes 181, 182 and 185 exposing the end portions 129 of the gate lines 121, the end portions 179 of the data lines 171, and portions of the drain electrodes 175, respectively. The passivation layer 180 is preferably made of inorganic insulator such as silicon nitride or silicon oxide, organic insulator, or low dielectric insulating material. The low dielectric material preferably has dielectric constant lower than 4.0 and examples thereof are a-Si:C:O and a-Si:O:F formed by plasma enhanced chemical vapor deposition (PECVD). At this time, the edges of the contact holes 162 and 165 of the partition 160 are exposed through the contact holes 182 and 185 of the passivation layer 180, but the edges of the contact holes 182 and 185 of the passivation layer 180 may be disposed in the contact holes 162 and 165 of the partition 160. The passivation layer 180 may be etched along with the partition 160 to form a plurality of contact holes 181, 182 and 185 when the partition 160 has not contact holes.

Finally, a plurality of pixel electrodes 190 and a plurality of contact assistants 81 and 82 are formed on the passivation layer 180 by sputtering and photo-etching a conductive layer preferably made reflective material, as shown in FIGS. 2 and 3. The contact assistants 81 and 82 may be made of material such as IZO or ITO different from the pixel electrodes 190 to enhance contact characteristics with external other signals.

After completing the thin film transistor array panel 100 as above described, a common electrode panel 200 having a common electrode 270, micro-capsule 230 and an adhesive 240 is aligned on the thin film transistor array panel 100. Then, the common electrode panel 200 is laminated on the thin film transistor array panel 100 by using a laminator 500 to combine the two panels 100 and 200 (FIG. 14).

In the manufacturing method of the EPD, the common electrode panel 200 is combined on the thin film transistor panel 100 through lamination, and the manufacturing method may be simplified.

In the present invention, the characteristics of thin film transistor may be stably enhanced thereby enhancing contrast ratio of the EPD. Also, the partition is used to define the organic semiconductor thereby simplifying the manufacturing process.

Also, the lamination process is used to combine the two panels, thereby simplifying the manufacturing process and reducing production cost.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrophoretic display, comprising:
    a thin film transistor array panel including a plurality of data lines having a plurality of source electrodes and a plurality of drain electrodes, a plurality of partitions having a plurality of openings, a plurality of organic semiconductor islands located in the openings and disposed between the source and the drain electrodes, a plurality of gate insulators formed on the organic semiconductor islands, a plurality of gate lines including a plurality of gate electrodes disposed on the gate insulators, and a plurality of pixel electrodes connected to the drain electrode;
    a common electrode panel facing the thin film transistor array panel and having a common electrode; and
    a plurality of micro-capsules containing a plurality of negative and positive pigment particles and interposed between the thin film transistor array panel and the common electrode panel.

2. The electrophoretic display of claim 1, further comprising:
    a partition having a plurality of openings disposed on the data lines and the drain electrodes and defining the organic semiconductor islands.

3. The electrophoretic display of claim 2, wherein the gate insulators are disposed in the plurality of openings.

4. The electrophoretic display of claim 1, further comprising:
    a passivation layer covering the gate line.

5. The electrophoretic display of claim 4, wherein the pixel electrode is disposed on the passivation layer.

6. The electrophoretic display of claim 1, wherein the pixel electrodes include opaque conductive material.

7. The electrophoretic display of claim 1, wherein the gate electrode is closer than the organic semi conductor islands to the common electrode panel.

8. The electrophoretic display of claim 1, wherein the thin film array panel and the common electrode panel are combined to each other by an adhesive.

9. The electrophoretic display of claim 1, wherein the gate insulating layer comprises at least a material selected from the group consisting of silicon dioxide, silicon nitride, maleimide-styrene, polyvinylphenol (PVP), and modified cyanoethylpullulan (m-CEP).

10. The electrophoretic display of claim 1, wherein the organic semiconductor comprises at least a material selected from the group consisting of:
    tetracene, pentacene, and derivatives thereof with substituent;
    oligothiophene including four to eight thiophenes connected at the positions 2, 5 of the thiophene rings.
    perylenetetracarboxylic dianhydride (PTCDA), naphthalenetetracarboxylic dianhydride (NTCDA), and imide derivatives thereof.
    metallized phthalocyanine and halogenated derivatives thereof;
    co-oligomer and co-polymer of thienylene and vinylene;
    regioregular polythiophene;
    perylene, coroene, and derivatives thereof with substituent; and
    aromatic and heteroaromatic ring of the above-described material, with at least one hydrocarbon chain, having one to thirty carbon at atoms.

* * * * *